June 4, 1957
B. VONNEGUT
2,794,341
VORTEX WHISTLE MEASURING INSTRUMENT FOR
FLUID FLOW RATES AND/OR PRESSURE
Filed July 13, 1953
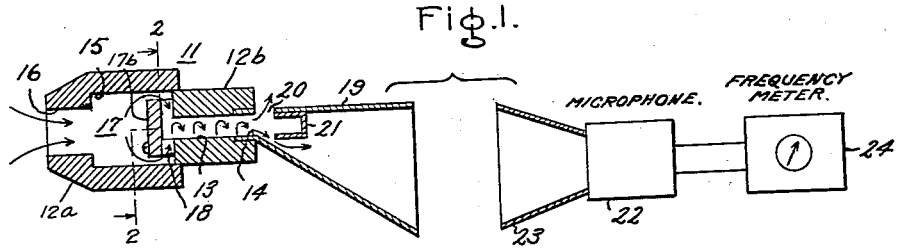
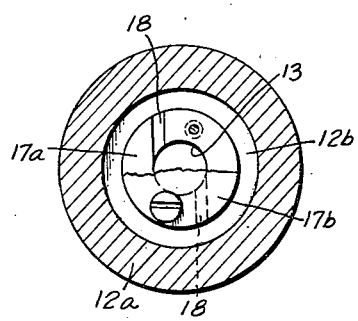
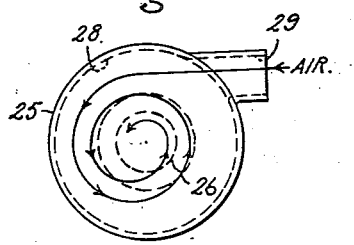 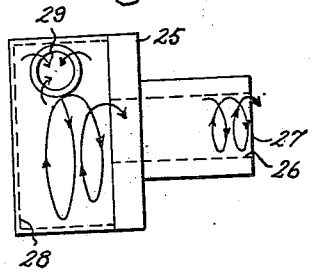
Inventor:
Bernard Vonnegut,
by Paul A. Frank
His Attorney.

United States Patent Office 2,794,341
Patented June 4, 1957

2,794,341

VORTEX WHISTLE MEASURING INSTRUMENT FOR FLUID FLOW RATES AND/OR PRESSURE

Bernard Vonnegut, Scituate, Mass., assignor to General Electric Company, a corporation of New York Application July 13, 1953, Serial No. 367,529

8 Claims. (Cl. 73—194)

The present invention relates to a vortex whistle for producing an output vibratory signal having a frequency of vibration related to the pressure and/or flow rate of fluid supplied thereto, and to a fluid pressure and/or fluid flow rate indicating instrument incorporating such whistle as a part thereof.

More specifically, the invention relates to a novel vortex whistle, and to a new and improved instrument utilizing such whistle for measuring the fluid flow rate and/or pressure of a fluid such as air or water. The invention is particularly well adapted for use in an air speed indicator for an airplane, in a ship's speed indicator, or to measure the pressure or rate of flow of fluid flowing in a conduit.

While there is a number of known instruments for measuring the true air speed of an airplane, the speed of a ship in water, or the pressure or rate of flow of fluid flowing in a conduit, a need still exists for a comparatively simple, accurate and relatively inexpensive instrument for performing these operations.

It is therefore one object of the present invention to provide a new and improved means for accurately measuring fluid pressure and/or flow rate.

Another object of the invention is to provide a fluid flow rate and/or pressure indicating instrument which requires very little maintenance.

Still another object of the invention is to provide an instrument having the above characteristics which is simple in design, and relatively cheap to manufacture.

A still further object of the invention is to provide a novel vortex whistle device that may be used as a musical toy.

In practicing the invention, a fluid pressure and/or fluid flow rate indicating instrument is provided which includes a flow sensitive transducing whistle device for producing a vibratory signal having a frequency related to the flow rate of the fluid supplied thereto. An electric translating mechanism is operatively coupled to the output of the transducing device for converting the vibratory signal to a varying electrical signal having a frequency of variation corresponding to the frequency of vibration of the vibratory signal and hence to the fluid flow rate. Operatively coupled to the output of the electrical translating mechanism is a frequency meter for deriving a perceptible indication of the pressure and/or fluid flow rate of the fluid supplied to the transducing device. The particular transducing whistle device utilized to produce a vibratory signal having a frequency related to the flow rate of a fluid supplied thereto preferably comprises a chamber having a cylindrical passageway formed therein, and having inlet and outlet openings to the passageway with the outlet opening being axially aligned with the passageway, and means mounted on the chamber for imparting a rotational movement to fluid introduced into the passageway.

Other objects, features and many of the attendant advantages of this invention will be appreciated more readily as the same becomes better understood by reference to the following detailed description, when considered in connection with the accompanying drawings, wherein like parts are identified by the same reference character, and wherein:

Fig. 1 is a schematic diagram of a fluid flow rate and/or pressure indicating instrument constructed in accordance with the invention, and illustrates one form of a vortex whistle device comprising a part of the indicating instrument;

Fig. 2 is a cross-sectional view of the vortex whistle device utilized in the instrument shown in Fig. 1, the cross-sectional view being taken through the plane 2—2 of Fig. 1;

Fig. 3 is an end view of a second form of a vortex whistle device suitable for use in the indicating instrument shown in Fig. 1; and Fig. 4 is a side view of the vortex whistle device shown in Fig. 3.

The pressure and/or fluid flow rate indicating instrument illustrated in Fig. 1 of the drawings includes a flow sensitive transducing device shown at 11 which preferably comprises a vortex whistle formed by a housing member 12 having a main portion 12a and an exit portion 12b. The exit portion 12b has a first cylindrical passageway 13 formed therein and an axially aligned outlet opening 14. The housing member 12 also has a second comparatively large passageway 15 within the main portion 12a which has an axially aligned inlet opening 16 providing communication thereto. Means are mounted on housing member 12 for imparting a rotational motion to fluid introduced into the first cylindrical passageway 13, and this means comprises a nozzle member 17 positioned at the junction of the first and second cylindrical passageways. As is best shown in Fig. 2 of the drawings, nozzle member 17 comprises a reduced shoulder portion 17a integral with the exit portion 12a and extending partially into the passageway 15. The cylindrical passageway 13 extends through the shoulder portion 17a and is terminated by a cover plate 17b fastened by means of screws or other adequate fastening means to the shoulder portion 17a. A plurality of grooves 18 for introducing fluid from said second passageway 15 into said first passageway 13 which extend through the shoulder portion 17a and are tangentially disposed to the cylindrical passageway 13, and thus impart a rotational motion to such fluid.

In operation, the fluid which is to be measured is caused to flow into the second passageway in housing member 12 through the inlet entrance 16, and from the second passageway is introduced into the first passageway 13 through the tangential grooves 18 and the nozzle member 17. This action results in imparting a rotational movement to the fluid introduced into passageway 13, and results in the creation of a vortex therein. If the housing member 12 were constructed of transparent glass and a bubble of air were introduced into a liquid flowing through the device, the vortex thus created would be observed to center along the longitudinal axis of the passageway 13 until it reaches the outlet opening 14, at which place it whips around following the rotation of the fluid in the passageway. It is this rotation of the vortex which is believed to produce a vibratory signal in the nature of sound which emanates from the vortex whistle 11. This vibratory signal (or sound) has been observed to vary in frequency with varying flow rates of fluid introduced into the whistle, and it has been determined that the frequency of the output sound varies almost linearly with the volume rate of fluid flow through the whistle. This relation appears to be independent of the density of the fluid or even whether it is a liquid or gas. It was also determined that the frequency of the output sound is related to variations in pressure in approximately the same manner that the velocity of flow is related to the pressure of the fluid existing at the input of the housing member 12. If desired, a horn 19 may be mounted on the outlet end of the first passageway 13 so as to amplify the sound produced by the vortex. The horn 19 preferably comprises an open ended substantially conically shaped horn member having a peripheral opening 20 therein with a cup-shaped barrier 21 disposed inside the horn adjacent the peripheral opening. The open end of the cup-shaped barrier is aligned with the edge of the peripheral opening, and the small open end of the conically shaped horn is aligned and communicates with the outlet opening 14 from passageway 13.

Operatively coupled to the output of the sound transducing device 11 is an electrical translating mechanism which preferably comprises a microphone 22 of standard construction but having a relatively wide frequency response range. Microphone 22 may have a horn 23 secured thereto for improving the acoustical coupling with the horn 19 mounted on the outlet end of the vortex whistle 11. Microphone 22 picks up the varying frequency acoustical signal produced by the vortex whistle 11, and serves to convert this varying frequency sound into a varying electrical signal having a frequency which corresponds to the frequency of the sonic signal produced by vortex whistle 11 and is likewise related to the rate of flow and/or pressure of the fluid applied to the input of the whistle. Coupled to the output of microphone 22 is a frequency meter 24 which, for example, may be of the Wein bridge type disclosed on page 957 of Terman, Radio Engineers Handbook, 1st edition, McGraw-Hill Book Co., 1943. The electric signal produced by microphone 22 is fed to frequency meter 24 which then derives a perceptible indication of the frequency value, and hence the rate of flow and/or pressure of the fluid supplied to the input of vortex whistle 11.

In operation, the transducing device 11 is disposed in the path of the fluid whose rate of flow is to be measured, or in a conduit wherein it is desired that the pressure of the fluid existing in the conduit be obtained, in a manner such that the fluid is caused to flow in through the inlet opening 16 and thence through the tangential openings in the nozzle member 17 to the first passageway 13 where the sound producing vortex is created through the rotation imparted to such fluid. The sound produced by the vortex is amplified somewhat by horn 19 and directed toward the microphone pickup 22 wherein it is converted to an electrical signal having a frequency related to the flow rate and/or pressure of the fluid supplied to the whistle 11. This electrical signal is supplied to frequency meter 24 which, if desired, can be calibrated in terms of flow units, or pressure which then provides an indication of the flow rate or pressure. Further, if desired, an integrating device may be applied to the instrument indicated in Fig. 1 so that the fluid flow can be integrated over a desired period of time to provide indications of total flow over the period of time measured. This latter measurement may then be readily interpreted in terms of air mileage of an airplane, for instance, if the instrument is used as an air speed indicator, or in terms of miles covered by a ship, if the instrument is used to provide an indication of a ship's speed through water. It is also possible, that the sound transducing vortex whistle device 11 be used as a separate instrument, or as a musical toy for it is possible to play simple tunes by merely varying the pressure of air which one blows into the vortex whistle.

In place of the transducing vortex whistle device 11 illustrated in the instrument shown in Fig. 1, a second different type of vortex whistle may be used which, as is best seen in Figs. 3 and 4 of the drawings, comprises a housing member 25 having a first cylindrical passageway 26 formed therein with an axially aligned outlet opening 27. A second comparatively larger cylindrical passageway 28 is also formed within housing member 25 which communicates directly with the cylindrical passageway 26 and has a tangential inlet opening 29 providing access thereto. In operation, the fluid whose rate of flow or pressure is to be measured is supplied to the inlet opening 29, and because of the tangential inlet arrangement for fluid introduced into the second chamber 28 is given a rotational movement. From the second passageway 28, the rotating fluid enters into the first or smaller passageway 26 and travels down the length of this passageway forming a vortex which is caused to whip around at the outlet end 27 thereof in a manner similar to that described with relation to the vortex whistle shown in Fig. 1. Upon emerging from the outlet end, the rotating vortex produces a sound signal which varies in frequency in accordance with the rate of fluid flow and/or pressure of the fluid applied to the tangential inlet opening 29 of the device. In view of the fact that the characteristics of the vortex whistle shown in Figs. 3 and 4 are precisely the same as that illustrated in the instrument shown in Fig. 1, the whistle of Figs. 3 and 4 can be substituted for that used in the instrument shown in Fig. 1. Likewise, if desired the whistle of Figs. 3 and 4 can be used separately as a musical toy, or as an instrument for entertainment purposes.

From the foregoing description, it can be appreciated that the invention provides a new and improved means for accurately measuring fluid pressure and/or flow rates, and if desired for integrating such flow rates to provide an indication of the total flow occurring with desired time period. The instrument provided is comparatively easy to install and operate as an air speed indicator, or as a water speed indicator, and it requires very little maintenance as it has few or no mechanically moving parts. The instrument is simple in design and can be cheaply manufactured, and in addition to its use as flow measuring device, the vortex whistle portion thereof can be used separately as an instrument for entertainment purposes, or as a musical toy.

Obviously, other modifications and variations of the present invention are possible in the light of the above teachings. It is therefore to be understood that changes may be made herein which are within the full intended scope of the invention as defined by the appended claims.

What I claim as new and desire to secure by Letters Patent of the United States is:

1. A fluid pressure and/or fluid rate indicating instrument comprising a flow rate sensitive vortex whistle having a member having a cylindrical chamber therein adapted to receive a fluid, means including at least one tangentially positioned passageway leading to said chamber to impart a vortex forming rotational movement to said fluid for producing a single sonic output signal having a frequency linearly related to the rate of flow, a sound sensitive microphone operatively coupled to the output of said vortex whistle for converting the sound waves into an electric signal having a frequency linearly related to the fluid flow rate, and a frequency measuring means coupled to the output of said microphone for producing a perceptible indication of the fluid flow rate.

2. A fluid pressure and/or fluid flow rate indicating instrument including a flow rate sensitive vortex whistle comprising a member having a cylindrical passageway therein and having inlet and outlet openings to the passageway with the outlet opening axially aligned with said passageway, and means mounted on the member for imparting a rotational movement to fluids introduced into said passageway about the axis of said passageway, a sound sensitive microphone operatively coupled to the output of said vortex whistle for converting the sound waves produced thereby into an electric signal having a frequency likewise related to the fluid flow rate, and a frequency meter operatively coupled to the output of said microphone for producing a perceptible indication of the fluid flow rate.

3. A fluid pressure and/or fluid flow rate indicating instrument including a flow rate sensitive vortex whistle comprising a housing member having a first cylindrical passageway formed therein with an axially aligned outlet opening and a second comparatively large cylindrical passageway interconnected and axially aligned with said first passageway and having an axially aligned inlet opening, and a nozzle member mounted at the junction of said first and second cylindrical passageways and having a plurality of tangentially disposed grooves therein communicating between said first and second passageways for introducing fluid from said second passageway into said first passageway and imparting a rotational movement to such fluid, a sound sensitive microphone operatively coupled to the output of said vortex whistle for converting the sound waves produced thereby into an electric signal having a frequency likewise related to the fluid flow rate, and a frequency meter operatively coupled to the output of said microphone for producing a perceptible indication of the fluid flow rate.

4. A fluid pressure and/or fluid flow rate indicating instrument including a flow rate sensitive vortex whistle comprising a housing member having a first portion with an enlarged cylindrical passageway formed therein and with a tangential inlet opening and an axial outlet opening connecting to the cylindrical passageway, and a second portion having a comparatively small cylindrical passageway formed therein with axially aligned inlet and outlet openings connecting thereto, the inlet opening in said second portion being aligned with and corresponding to the outlet opening of said first portion of the housing member, a sound sensitive microphone operatively coupled to the output of said vortex whistle for converting the sound waves produced thereby into an electric signal having a frequency likewise related to the fluid flow rate, and a frequency meter operatively coupled to the output of said microphone for producing a perceptible indication of the fluid flow rate.

5. A vortex whistle comprising a housing member having a first cylindrical passageway formed therein with an arially aligned outlet opening and a second comparatively large cylindrical passageway interconnected and axially aligned with said first passageway and having an axially aligned inlet opening, and a nozzle member mounted at the junction of said first and second cylindrical passageways and having a plurality of tangentially disposed grooves therein communicating between said first and second passageways for introducing fluid from said second passageway into said first passageway and imparting a rotational movement to such fluid.

6. A vortex whistle comprising a housing member having a first cylindrical passageway formed therein with an axially aligned outlet opening and a second comparatively large cylindrical passageway interconnected and axially aligned with said first passageway and having an axially aligned inlet opening, a nozzle member mounted at the junction of said first and second cylindrical passageways and having a plurality of tangentially disposed grooves therein communicating between said first and second passageways for introducing fluid from said second passageway into said first passageway and imparting a rotational movement to such fluid, and an amplifying horn secured to said housing member adjacent the outlet opening therefrom.

7. A vortex whistle comprising a housing member having a first cylindrical passageway formed therein with an axially aligned outlet opening and a second comparatively large cylindrical passageway interconnected and axially aligned with said first passageway and having an axially aligned inlet opening, a nozzle member mounted at the junction of said first and second cylindrical passageways and having a plurality of tangentially disposed grooves therein communicating between said first and second passageways for introducing fluid from said second passageways into said first passageway and imparting a rotational movement to such fluid, and an amplifying horn secured to said housing member adjacent the outlet opening of said first passageway, said horn comprising an open ended substantially conically shaped horn member having a peripheral opening therein with a cup-shaped barrier disposed adjacent the peripheral opening inside the conically shaped horn member, the open end of the cup-shaped barrier being aligned with the edge of the peripheral opening and the small open end of the conically shaped horn member being aligned and communicating with the outlet opening in said first passageway.

8. A fluid operated vortex whistle comprising a housing member having a first enlarged cylindrical chamber, a tangential inlet opening for imparting a vortex forming rotational movement to incoming fluid, a first axial outlet opening, a second comparatively small unobstructed cylindrical chamber having its inlet and outlet openings axially aligned with said first axial outlet opening to permit the rotating fluid to move along the axial length of said second cylindrical chamber to produce a single sonic output signal.

References Cited in the file of this patent
UNITED STATES PATENTS

| Number | Name | Date |
| --- | --- | --- |
| 1,215,135 | Fisher | Feb. 6, 1917 |
| 1,935,444 | Heinz | Nov. 14, 1933 |
| 1,952,281 | Ranque | Mar. 27, 1934 |
| 2,492,371 | Sivian | Dec. 27, 1949 |
| 2,518,149 | Kearsley | Aug. 8, 1950 |
| 2,519,015 | Bensen | Aug. 15, 1950 |
| 2,582,232 | Cesaro et al. | Jan. 15, 1952 |